United States Patent

Tsuchida et al.

Patent Number: 5,411,580
Date of Patent: May 2, 1995

[54] OXYGEN-SEPARATING POROUS MEMBRANES

[75] Inventors: Eishun Tsuchida; Hiroyuki Nishide, both of Tokyo; Hiroyoshi Kawakami, Hachioji; Yukiko Sasame, Kodaira, all of Japan

[73] Assignee: Praxair Technology, Inc., Danbury, Conn.

[21] Appl. No.: 740,902

[22] Filed: Jul. 31, 1991

[51] Int. Cl.$^6$ ............ B01D 53/22; B01D 71/00
[52] U.S. Cl. ............................ 96/5; 95/54; 96/8
[58] Field of Search ............ 55/16, 68, 158; 95/44, 95/45, 54; 96/5, 7, 8

[56] References Cited

U.S. PATENT DOCUMENTS

| | | | |
|---|---|---|---|
| 3,957,504 | 5/1976 | Ho et al. | 55/16 X |
| 4,343,715 | 8/1982 | Bonaventura et al. | 55/68 X |
| 4,427,416 | 1/1984 | Bonaventura et al. | 55/68 X |
| 4,451,270 | 5/1984 | Roman | 55/68 X |
| 4,542,010 | 9/1985 | Roman et al. | 55/68 X |
| 4,609,383 | 9/1986 | Bonaventura et al. | 55/16 |
| 4,654,053 | 3/1987 | Sievers et al. | 55/68 |
| 4,668,255 | 5/1987 | Govind | 55/68 X |
| 4,680,037 | 7/1987 | Ramprasad et al. | 55/16 |
| 4,705,544 | 11/1987 | Okita et al. | 55/16 X |
| 4,713,091 | 12/1987 | Govind | 55/68 X |
| 4,761,209 | 8/1988 | Bonaventura et al. | 55/16 X |
| 4,888,032 | 12/1989 | Busch | 55/68 X |
| 4,985,053 | 1/1991 | Sugie | 55/16 X |

FOREIGN PATENT DOCUMENTS

| | | | |
|---|---|---|---|
| 0186182 | 7/1986 | European Pat. Off. | 55/158 |
| 0304818 | 3/1989 | European Pat. Off. | 55/158 |
| 56-048246 | 5/1981 | Japan | 55/16 |
| 61-230708 | 10/1986 | Japan | 55/158 |
| 61-271005 | 12/1986 | Japan | 55/158 |
| 62-171730 | 7/1987 | Japan | . |
| 62-241551 | 10/1987 | Japan | 55/158 |
| 63-001422 | 1/1988 | Japan | 55/158 |
| 63-093789 | 4/1988 | Japan | 55/158 |
| 63-156565 | 6/1988 | Japan | 55/158 |
| 01-242124 | 9/1989 | Japan | 55/158 |
| 02-152529 | 6/1990 | Japan | 55/16 |

OTHER PUBLICATIONS

Composite Polymeric Membrane Containing Oxygen Carrier, Masanori Ikeda and Hirokazu Ohno, Proceedings, vol. 1, The 1990 International Congress on Membranes and Membrane Processes, ICOM '90, Chicago, USA, 1990, pp. 667–669.

*Primary Examiner*—Robert Spitzer
*Attorney, Agent, or Firm*—Alvin H. Fritschler

[57] ABSTRACT

Oxygen-separating porous membranes comprise a complex of (a) a transition metal (II) ion, (b) a ligand, and (c) an aromatic amine, retained in the pores of a substrate.

4 Claims, No Drawings

OXYGEN-SEPARATING POROUS MEMBRANES

BACKGROUND OF THE INVENTION

This invention relates to oxygen-separating porous membranes to be used in oxygen-enriching processes, typically for combustion gas production, for medical treatment. More particularly, the invention concerns porous membranes which contain, as dispersed in the pores, a metal complex capable of adsorbing and desorbing oxygen rapidly and reversibly.

Oxygen is one of the chemicals most widely used on industrial scales, specifically in the manufacture of iron, steel, and other metals and glass, in chemical oxidation and combustion, and in wastewater disposal. In the field of medical care too, it has very wide applications including the therapy for lung disease patients by means of oxygen inhalation. For these reasons the development of processes for concentrating oxygen out of air is an important problem with far-reaching effects on various sectors of industry. While dominant industrial processes for atmospheric oxygen concentration today are low-temperature and adsorption techniques, membrane separation is considered promising from the energy-saving viewpoint.

Success of membrane separation depends primarily on the discovery of a membrane material that would permit selective and efficient oxygen permeation relative to nitrogen from air. Currently available membranes capable of permeating and concentrating atmospheric oxygen (known as oxygen-enriching membranes) are those of silicone, silicone polycarbonate, and the like. Some of them are in practical service. They do not have high oxygen-permeation selectivity (oxygen-permeability coefficient/nitrogen-permeability coefficient, or ratio $\alpha$), the value being approximately 2, and yet exhibit high permeability coefficient ($10^{-8}$ [$cm^3 \cdot (STP) \cdot cm/cm^2 \cdot sec \cdot cmHg$]). With this feature the membranes are incorporated in modules, multistage processes, and other systems to obtain oxygen-enriched air, with oxygen concentrations of approximately 30%.

Gas separation by the use of microporous membranes ranging in pore size from several ten to several hundred angstroms is also extensively performed. Gas permeation through a porous mass is dictated by the ratio of the distance over which the particular gas particles impinge upon one another, or the mean free path, $\lambda$ to the pore diameter r, ($r/\lambda$). When the pore diameter is small, being $r/\lambda < 1$, the mutual impingement of the gas particles is ignored. The permeation conforms to the Knudsen flow in which it is inversely proportional to the square root of the molecular weight of the gas. Gas permeation based on this permeation mechanism attains a strikingly high permeability coefficient. Nevertheless, the process is unsuitable for the oxygen separation by permeation from air, because, when separating gases of dissimilar molecular diameter, such as oxygen and nitrogen, the selectivity becomes less than 1.

It has been reported that generally gas molecules once adsorbed by the pore surface of a porous membrane will diffuse over the adsorption layer for permeation, resulting in a substantial increase in permeability. However, the phenomenon is limited to operations handling lower hydrocarbons, carbonic gas, and other gases of relatively high boiling points. The phenomenon also is observed only when membranes with pore diameters from about 30 to about 300 Å are used. Oxygen permeation from air has not in the least been known in the art.

In order to obtain highly oxygen-rich air useful for industrial and medical applications by a single permeable-membrane pass, it is essential that the separating membrane have a high oxygen-permeability coefficient, of the order of $10^{-8}$, and an $\alpha$ of at least 5.

Polymeric membranes of silicone and the like exhibit oxygen-permeability coefficients as high as about $10^{-8}$, but their oxygen selectivities are low. The porous membranes that rely upon the Knudsen flow for gas permeation are incapable of separating oxygen and nitrogen, although they show greater permeability than polymeric membranes.

We have hitherto continued the synthesis of metal complexes capable of rapid, reversible adsorption and desorption of oxygen molecules. As a result, we clarified essential requirements of the metal complexes that can adsorb and desorb oxygen molecules selectively, rapidly, and reversibly, even in a solid-phase polymer. We successfully synthesized the novel complexes and taught their use for oxygen-separating membranes (Japanese Patent Application Public Disclosure No. 171730/1987). However, polymeric membranes incorporating such complexes, when used in air permeation, did not always achieve the object satisfactorily. Although the $\alpha$ value exceeded the target value of 5, the permeability coefficient was only $10^{-9}$. For the treatment of a sufficiently large volume of air for oxygen enrichment, an additional step, for example, of providing an extra thin film, was required.

SUMMARY OF THE INVENTION

In view of the above, we have made further intensive research and have now successfully produced membranes having oxygen-permeation selectivity while maintaining high gas permeability, by allowing a porous support to hold a porphyrin metal complex uniformly in the pores under certain conditions.

Thus, the invention relates to oxygen-separating porous membranes as follows:

1. An oxygen-separating porous membrane characterized by a complex comprising (a) a transition metal (II) ion, and (b) a ligand taken from the group consisting of (1) porphyrins, (2) Schiff bases, (3) cyclidenes, and (4) amine-like macrocycles, and (c) an aromatic amine, said complex retained in the pores of a porous substrate, the mean free pore diameter of said porous membrane being in the range of 3.5 to 100 Å.
2. The membrane of 1 above in which said ligand is a porphyrin.
3. The membrane of 2 above in which said porphyrin is meso-tetrakis($\alpha,\alpha,\alpha,\alpha$-o-pivalamidophenyl)porphyrinato.
4. The membrane of 1 above in which said transition metal (II) comprises cobalt (II).
5. The membrane of 1 above in which said aromatic amine comprises (1) copolymers of a vinyl aromatic amine and either (a) an alkyl acrylate or (b) an alkyl methacrylate, or (2) a low-molecular-weight aromatic amine.
6. The membrane of 5 above in which said aromatic amine is a copolymer of a vinyl aromatic amine and either (i) an alkyl acrylate or (ii) an alkyl methacrylate, containing 1 to 15 carbon atoms in the alkyl group thereof.

7. The membrane of 1 above in which said transition metal (II) comprises from about 0.02 to 1.7 millimoles per gram of said complex.
8. The membrane of 7 above in which said transition metal (II) comprises from about 0.20 to 1.7 millimoles per gram of said complex.
9. The membrane of 1 above in which said porous substrate comprises an inorganic porous membrane.
10. The membrane of 1 above in which said porous substrate comprises an organic porous membrane.
11. The membrane of 10 above in which said porous substrate comprises polysulfone.
12. The membrane of 10 above in which said porous substrate comprises polyimides.
13. The membrane of 1 above in which said porous membrane comprises a flat film or a hollow fiber membrane.
14. The membrane of 1 above in which said transition metal (II) comprises cobalt (II), said porphyrin is meso-tetrakis-($\alpha,\alpha,\alpha,\alpha$-o-pivalamidophenyl)porphyrinato, and said porous membrane comprises hollow fibers.
15. The membrane of 1 above in which said mean free pore diameter is in the range of 3.8 to 60Å.
16. The membrane of 14 above in which said mean free pore diameter is in the range of 3.8 to 60Å.
17. The membrane of 14 above in which said aromatic amine comprises (1) copolymers of a vinyl aromatic amine and either (a) an alkyl acrylate or (b) an alkyl methacrylate, or (2) a low-molecular-weight aromatic amine.

DETAILED DESCRIPTION OF THE INVENTION

Metal complexes capable of reversible oxygen adsorption and desorption usually are complexes consisting of a metal ion of a low oxidation number and a ligand of conjugated system combined with an aromatic amine. The present invention preferably utilizes a complex consisting of a meso-tetrakis($\alpha,\alpha,\alpha,\alpha$-o-pivalamidophenyl)porphyrinato metal (II) as the first component and either a copolymer of a vinyl aromatic amine and an alkyl acrylate or alkyl methacrylate or a low-molecular-weight aromatic amine as the second component. The metal in the metal complex is a bivalent metal element, preferably cobalt.

As the ligand that constitutes the metal complex, any of those mentioned above may be used.

Among other examples of porphyrins is "PRIXDME", protoporphyrin IX dimethyl ester.

Examples of Schiff bases include "salen", bis(salicylideneiminato)ethylenediamine, and "3-methoxysaltmen", N,N'-bis-(3-methoxysalicylideneiminato)tetramethylethylenediamine.

Cyclidenes are, for example, "lacunar methyl, methyl-$C_6$-cyclidene", 2, 3, 10, 11, 13, 19-hexamethyl-3, 10, 14, 18, 21, 25-hexaazabicyclo[10.7.7]hexacosa-1,11,13,18,25-hexene$_k{}^4N$, and "lacunar phenyl,benzyl-metaxylyl-cyclidene", 3,11-dibenzyl-2,12-diphenyl-3,11,15,19,22,26-hexaazatricyclo[11.7.7.1$^{5,9}$]-octacosa-1,5,7,9(28),12,14,19,21,26-nonaene$_k{}^4N$.

Examples of amine-like macrycycles are "lacunar Me$_2$(p-xylylene)Me$_2$malMeDPT", 7,19-Diacetyl-6,20-diketo-8,13,18-trimethyl-26,33-dioxa-9,13,17-triazatricyclo [23.8.2$^{28,31}$.1$^{1,5}$.-1$^{21,25}$]heptatriaconta-1,3,5(36),7,18,21,23,25(37),28,30,34-undecaenato-$k^3N$-$k$20, and "salMeDPT", bis-(salicylideneiminato)undecaenato)-N-methyl-dipropylenetriamine.

The transition metal (II) ion, especially cobalt (II), forms a complex which has reversible interactions with $O_2$.

The aromatic amine functions as the axial base in the complex, "activating" the complex for reversible interactions with $O_2$. The amine residues, such as derivatives of pyridine or imidazole, may be present in either high-molecular-weight polymers as pendant groups, or in low-molecular-weight individual molecules.

Such a complex is dissolved in a dichloromethane solution, and a porous support is immersed in the solution. After full retention of the complex in the pores has been confirmed, the impregnated support is dried in vacuum to obtain a porous membrane. The porous support for this purpose may be any of materials in which each pore is open on one side and extends backward to open also on the opposite side. An inorganic support of porous glass, porous alumina, porous carbon or the like is a good choice. The porous membrane has a mean pore diameter of 100 Å or less, desirably 50 Å or less, provided the complex can be retained in the pores without clogging the latter. The mean pore diameter is limited to 100 Å or less because if it exceeds 100 Å the Knudsen flow becomes dominant, reducing the $\alpha$ value of oxygen-permeation selectivity. The specific composition and conditions for preparation as will be described later permit the pores of the porous membrane to be kept unclogged. Consequently, the membrane maintains high gas permeability (the Knudsen flow) and attains high oxygen selectivity since the complex dispersedly held on the pore surface causes selective, rapid adsorption and desorption of oxygen, which in turn produces a surface diffused flow that adds to the selectivity.

The introduction of a complex capable of rapid, reversible oxygen adsorption and desorption has now rendered it possible for the first time to observe a surface diffused flow on a porous membrane. It is apparently for this reason that an oxygen-separating membrane is obtained which exhibits exceptionally efficient performance (an oxygen-permeability coefficient of approximately $10^{-6}$ and selectivity of 5 or more).

For use in the present invention it is desirable that the complex comprises, as a metal complex of a porphyrin compound, a meso-tetra($\alpha,\alpha,\alpha,\alpha$-o-pivalamidophenyl)porphyrinato metal (II) and, as an aromatic amine ligand, a copolymer of a vinyl aromatic amine and an alkyl acrylate or alkyl methacrylate, typified by poly(N-vinylimidazole-co-octyl methacrylate) or the like, or N-methylimidazole or pyridine.

The metal ion and the ligand residue that constitute a complex are in a molar ratio appropriately in the range from 1:1 to 1:50.

A porphyrin and a ligand are separately dissolved uniformly in an organic solvent such as dichloromethane, thoroughly deoxidized, and mixed up. Into this mixed solution is immersed a porous support in an oxygen-free atmosphere. After the complex has been adequately supported in the pores, the porous membrane is finished by vacuum drying. In this case the porphyrin content is desirably chosen from the range of about 1 to about 30% by weight. There is no specific limitation to the form of the porous membrane, but a flat or tubular shape is desirable. For the manufacture of the membrane thorough oxygen removal from the complex solution in advance is advisable.

The use of the membrane according to the invention permits oxygen enrichment with a high selectivity, at the $\alpha$ value of 5 or upwards. Also, because of the extremely high permeability coefficient, single-step concentration by a membrane with an effective area of one square meter can yield as much as air with an oxygen concentration of at least 60% per hour. In a system for removing residual oxygen from nitrogen in which the oxygen concentration has been reduced down to 1%, the membrane makes it possible to afford 99.99%-pure nitrogen. For the purposes of the invention the measurements of gas permeability with oxygen-enriching membranes are evaluated by gas chromatography.

EXAMPLES

The invention will be more fully described below in connection with examples thereof which, of course, are in no way limitative.

Example 1

For the manufacture of a tubular porous membrane, a tube of porous glass 7 mm in outside diameter and 1.1 mm in wall thickness was employed. The glass (marketed by Corning Glass Works under the trade designation "Vicor #7930") had a porosity of 28% and an average pore diameter of 40 Å, the size ranging from 40 to 70 Å. The porous glass was conditioned and prepared in the following way. Test pieces of the glass, cut to lengths of 11 cm each, were immersed in 5N hydrochloric acid for 2 to 3 days and then washed with pure water for one full day. They were heated in a nitrogen atmosphere at 80° C. until the porous glass became clear, further heated up to 180° C. while the pressure was reduced to $10^{-3}$ mmHg, and dried.

Twelve milliliters of a dichloromethane solution containing 100 mg meso-tetra($\alpha,\alpha,\alpha,\alpha$-o-pivalamidophenyl)porphyrinato metal (II) (hereinafter called "CoP" for brevity) and 20 ml of a dichloromethane solution containing 600 mg poly(N-vinyl-imidazole-co-octyl methacrylate) were mixed. After one hour of nitrogen gas injection into the mixed solution, the activated tubular porous supports were immersed in the solution for 2 to 3 days. Following the confirmation that the complex had been retained in the pores, the porous membranes were taken out into a dry box under a nitrogen atmosphere and then dried in vacuum. Red, clear porous membranes were obtained which contained 3% by weight of the complex and had pores 40 Å or less in diameter, with adequate mechanical strength.

Thorough introduction of the CoP complex into the porous glass was confirmed by electron spectroscopy for chemical analysis (ESCA). Nitrogen adsorption indicated that the surface area decreased with the introduction of the complex.

Reversible oxygen adsorption and desorption of the porphyrin complex in the membranes could be confirmed from changes in the visible spectrum (oxygen-combined type: 545 nm; deoxygenation type: 528 nm).

The porous membranes thus prepared were tested for their mixed oxygen-nitrogen gas permeability by gas chromatography. When a mixed gas with an oxygen concentration of 2.6% was supplied, the permeability coefficient was $4.1 \times 10^{-6}$ cm$^3$·(STP)·cm/cm$^2$·sec·cmHg and $\alpha=7$, achieving efficient permeation of oxygen. The comparative values of a complex-free porous membrane determined under identical conditions were: permeability coefficient $7.8 \times 10^{-6}$ cm$^3$·(STP)·cm/cm$^2$·sec·cmHg and $\alpha=0.98$. Obviously, the membranes according to the invention were superior in performance. The oxygen permeability of the membranes remained stable with little change one month later.

Example 2

In Example 1, a combination of CoP and poly(N-vinyl-imidazole-co-lauryl methacrylate) was used instead; otherwise the same procedure was followed. Porous membranes, red and clear, which contained 3% by weight of the resulting complex and had a pore size of 40 Å or less and adequate mechanical strength were obtained. Permeability tests of the membranes, conducted in the same way as in Example 1, indicated their ability of efficient oxygen production, with a permeability coefficient of $4.2 \times 10^{-6}$ cm$^3$·(STP)·cm/cm$^2$·sec·cmHg and $\alpha=6$.

Example 3

The procedure of Example 1 was repeated with the exception that the ligand was replaced by poly(N-vinylimidazole-co-butyl methacrylate). Porous membranes containing 3% by weight of the complex, red and clear, and which possessed a pore size of 40 Å or less and adequate mechanical strength resulted. Permeability measurements made in the same way as in Example 1 gave a permeability coefficient of $4.5 \times 10^{-6}$ cm$^3$·(STP)·cm/cm$^2$·sec·cmHg and $\alpha=7$, indicating efficient oxygen production.

Example 4

Excepting the use of N-methylimidazole as the ligand, the procedure of Example 1 was followed to obtain red, clear porous membranes containing 3% by weight of the complex and having a pore size of 40 Å or less and satisfactory mechanical strength. Permeability measurements performed similarly to Example 1 indicated efficient oxygen production, with a permeability coefficient of $8.5 \times 10^{-6}$ cm$^3$·(STP)·cm/cm$^2$·sec·cmHg and $\alpha=5$.

The oxygen-separating porous membranes according to the present invention comprise a porous membrane and a certain porphyrin complex dispersed on the pore surface of the membrane. Their oxygen-permeability coefficients are as high as approximately $10^3$ times those of conventional polymeric membranes containing or not containing metal complexes. They can, therefore, treat by far the larger volume of gases, with the selectivity value $\alpha$ as oxygen-separating membranes in excess of 5. The membranes are capable of collecting oxygen-rich gases from lean feed gases or even recovering high-purity nitrogen gas by single-stage permeation. Further outstanding advantages are that they do not deteriorate with time but maintain good durability and heat resistance.

What is claimed is:

1. An oxygen-separating porous membrane characterized by a complex comprising (a) a transition metal (II) ion, (b) a porphyrin ligand consisting of meso-tetrakis ($\alpha,\alpha,\alpha,\alpha$-o-pivalamidophenyl)porphyrinato, and (c) an aromatic amine, said complex retained in the pores of a porous substrate, the mean pore diameter of said porous membrane being in the range of 3.5 to 100 Å.

2. The membrane of claim 1 in which said transition metal (II) comprises cobalt (II), and said porous membrane comprises hollow fibers.

3. The membrane of claim 2 in which said me, an free pore diameter is in the range of 3.8 to 60 Å.

4. The membrane of claim 2 in which said aromatic amine comprises (1) copolymers of a vinyl aromatic amine and either (a) an alkyl acrylate or (b) an alkyl methacrylate, or (2) a low-molecular-weight aromatic amine.

* * * * *